June 8, 1937.  C. B. AIKEN  2,083,416
RADIO DIRECTION FINDING SYSTEM
Filed Aug. 4, 1934
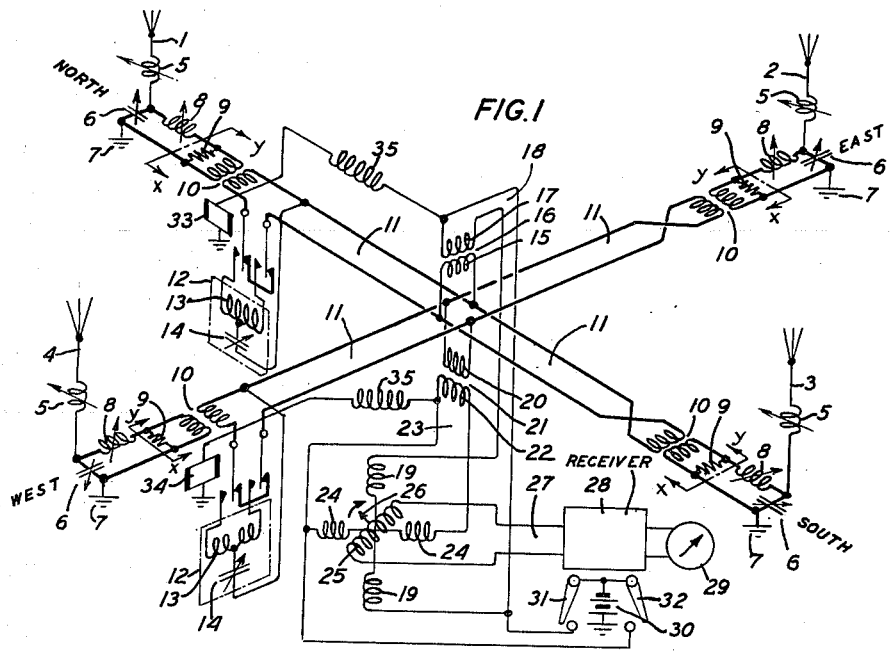
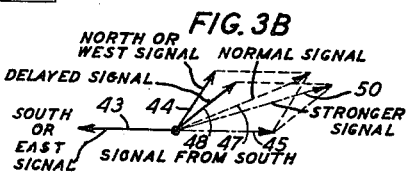
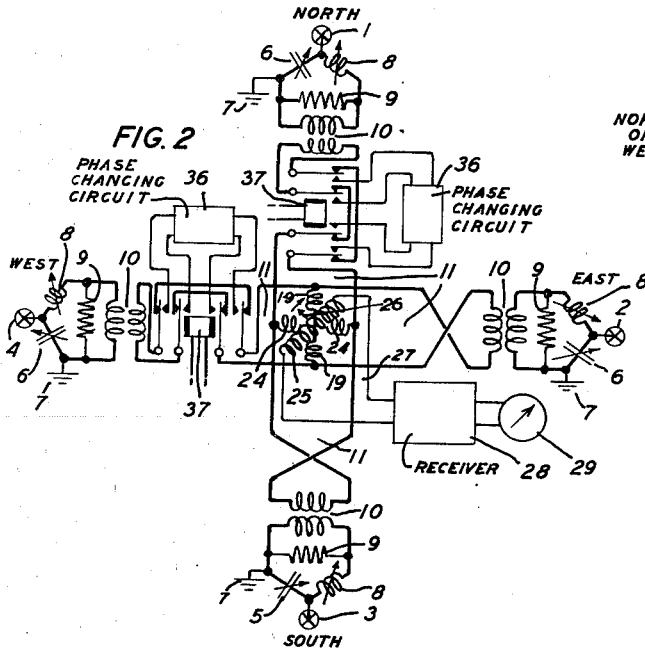
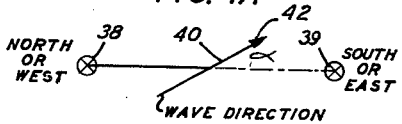
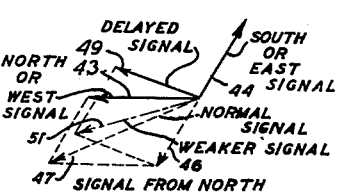
INVENTOR
C. B. AIKEN
BY
E. V. Griggs
ATTORNEY Patented June 8, 1937

2,083,416

UNITED STATES PATENT OFFICE 2,083,416

RADIO DIRECTION FINDING SYSTEM

Charles B. Aiken, New York, N. Y., assignor to Bell Telephone Laboratories, Incorporated, New York, N. Y., a corporation of New York Application August 4, 1934, Serial No. 738,425

9 Claims. (Cl. 250—11)

This invention relates to radio direction finding systems and more particularly to a system for determining the direction and sense of a radio wave.

As is well known, radio goniometer systems comprising two crossed loops or four vertical antennas positioned at the corners of a square and arranged to function as two crossed loops have been suggested for ascertaining the direction of a radio wave. In such systems energy received non-directionally by means of a separate vertical antenna, or by means of the whole absorbing structure functioning as a vertical antenna, is superimposed on the directionally received energy for the purpose of resolving the 180 degree ambiguity obtained when the directional system is used alone. In the case of the large four vertical antenna system, it appears desirable for reasons of economy and simplicity to determine the directional sense of the wave without using additional absorbing structure and without employing the additional transmission line or lines usually necessary for obtaining a non-directional effect from the entire system.

It is one object of this invention to determine the directional sense of a radio wave in an economical and simple manner.

It is another object of this invention to determine the direction and sense of a radio wave in a more accurate and dependable manner than heretofore practised.

It is still another object of this invention to eliminate substantially in direction finding systems and during the period of direction determination, the effect of small changes in antenna impedance occasioned by wind and other forces.

According to this invention, four vertical antennas arranged to function as two crossed loops are positioned at the corners of a square, the corners corresponding to the four compass points. The north and south antennas are connected to one stator goniometer coil and the east and west antennas are connected to the other stationary goniometer coil. A phase delay circuit is removably connected by means of a relay and a switch between the north antenna and the associated coil, and another delay circuit is similarly connected between the west antenna and its associated coil. With the delay circuit removed from the system, the path or direction of the wave is determined by rotating the goniometer search coil until a minimum response is obtained, as indicated by a visual or aural indicator in the output of a receiver connected to the search coil. Assuming the path of the wave is more north and south than east and west, the search coil is rotated to a position parallel to the north-south coil and the receiver output is noted. The delay circuit associated with the north antenna is then inserted and the receiver output is again noted. A decrease in the output as compared with the output first noted indicates that the signal is coming from a northerly direction, whereas an increase indicates the signal is from the south. If the path of the wave favors the east-west direction, the directional sense, east or west, of the wave is determined in a manner similar to that explained above but in which the east-west antennas and associated equipment are employed.

The invention will be more fully understood from the following description taken in connection with the drawing on which like reference characters denote elements of similar function, and on which:

Fig. 1 illustrates one embodiment of the invention;

Fig. 2 illustrates a slightly different embodiment of the invention;

Figs. 3A and 4A are plan views of a pair of antennas used in the system of Figs. 1 and 2; and Figs. 3B and 4B are diagrams used in explaining the invention.

Referring to Fig. 1 of the drawing, reference numerals 1, 2, 3 and 4 designate four vertical non-directional antennas positioned at the north, east, south and west corners of a square. Each antenna is connected through a variable inductance 5 and a variable condenser 6 to the ground 7. Reference numeral 8 denotes a tuning inductance and reference numeral 9 a resistance which are connected in shunt to condenser 6. Each antenna is inductively coupled to a branch transmission line 11 by means of a transformer 10 the primary coil of which is connected across the resistance 9. A delay circuit 12 comprising a series inductance 13 and a shunt variable condenser 14 is removably included in each of the branch lines 11 associated with the north and west antennas. The branch lines 11 associated with the north and south antennas are connected in shunt with primary coil 15 of transformer 16, the secondary winding 17 of which is associated by means of main transmission line 18 with stator goniometer coil 19. Similarly, the branch lines 11 associated with the east and west antennas are connected in shunt with the primary winding 20 of transformer 21, the secondary winding 22 of which is connected by means of main transmission line 23 to the other stationary goniometer coil 24. The branch transmision lines 11 associated with the east and south antennas are transposed for the purpose of reversing the phase of the currents supplied by said antennas, whereby the diagonally opposite vertical antennas are rendered, in a sense, similar to the opposite sides of a loop. Obviously the phase of each of the currents from the east and south antennas may be reversed by means other than a transposed line.

Stator coils 19 and 24 are inductively associated with a goniometer search coil 25 which has pointer 26 and is connected by means of transmission line 27 to the receiver 28. The receiver output is connected to an indicator 29. Reference numeral 30 designates a battery and numerals 31 and 32 denote switches which control, respectively, relays 33 and 34, which relays in turn control, respectively, the delay circuits associated with the north and west antennas. Choke coil 35 prevents the flow of radio frequency energy to relays 33 and 34.

The system illustrated by Fig. 2 is essentially the same as that illustrated by Fig. 1, the chief difference between the two systems being that in the system of Fig. 2 the branch lines 11 are connected directly to the stator goniometer coils 19 and 24, whereas in the system of Fig. 1 a transformer and a main transmission line are included between each pair of branch lines and the goniometer. Also, in place of the delay circuit 12 and relays 33 and 34 included in the system of Fig. 1, a phase changing circuit 36 which may contain either lumped or distributed impedance is removably associated by means of the relay 37 with north antenna 1 and a similar phase changing device 36 is removably associated by means of another relay 37 with the west antenna 4.

Referring to Fig. 1, the operation of the system is as follows: The two delay circuits 11 are normally removed from the system. After tuning the system for a particular incoming wave the search coil 25 is rotated until a minimum response is obtained in the output of receiver 28, as indicated by meter 29. The pointer 26 indicates the direction or path, but not the sense of direction of the desired wave. The determined path of the wave will intercept either the line joining the north and south antennas, or the line joining the west and east antennas, at an angle less than 45 degrees. Assuming that the path makes an angle less than 45 degrees with the north-south reference line, the search coil 25 is rotated until it extends in a direction parallel to stator coil 19, that is, until pointer 26 is directed toward the east or west. The receiver output as measured by indicator 29 is noted. A delay circuit 12 is then inserted by means of switch 31 and relay 33 in the north antenna branch line 11 and the receiver output is again noted. If the second mentioned output is greater than the first mentioned output, the signal is coming from the south, and if it is smaller it is coming from a northerly direction. If the wave is more east-west than north-south, the east-west antennas are employed for determining the east or west directional sense.

Considering one pair of diagonally opposite antennas each resistance 9 functions to render the operation of the antenna associated with the other resistance 9 substantially independent, over a band of frequencies, of impedance variations in the antenna associated with the first mentioned resistance 9, as occasioned by weather conditions. Stated differently, by connecting a resistance 9 across the branch line 11 associated with antenna 3, for example, the resistance 9 having a value of the order of two or three times the value of the characteristic impedance of said branch line 11, the terminating impedance for the branch line 11 connected to antenna 1 is rendered substantially constant.

Considering any one of the four antennas, the reactances of the associated condenser 6 and coil 5 are of the same magnitude for a given frequency and inductance coil 5 is adjusted to have a value such that the voltage delivered to the receiver 28 by said antenna is substantially independent of the impedance variations of said antenna. Applicant has found that the magnitude of the reactance of coil 5 may be determined, approximately, by the following equation:

$$Z_5 = |Z_6| \pm \sqrt{KZ_{11}Z_v - \frac{Z_6^4}{Z_v^2}} \quad (1)$$

where,
 $Z_5$ = the reactance of coil 5
 $Z_6$ = reactance of condenser 6
 $K$ = constant dependent upon the expected per cent variation in the antenna impedance
 $Z_v$ = maximum value of antenna impedance variation
 $Z_{11}$ = send end impedance of associated branch 11 looking from $xy$.

The operation of the system of Fig. 2 is substantially the same as that of the system of Fig. 1. Relays 37 associated with antennas 1 and 4 are operated by means of switches (not shown) energized by a battery or other source of energy (not shown) for the purpose of determining the direction sense of the incoming wave. The direct association of the goniometer coils 19 and 24 with the branch transmission line 11 effects not only economy, but also improved operation in view of decrease in line loss.

Referring to Figs. 3A, 3B, 4A and 4B, the theory underlying the sense determination will now be explained in detail. In Figs. 3A and 4A, reference numerals 38 and 39 designate spaced nondirectional antennas, such as a pair of diagonally opposite antennas included in the system of Fig. 1, the reference line between said antennas intercepting the path 40 of the desired wave at an angle $\alpha$. Path 40 may have the direction indicated by arrowhead 41 in Fig. 3A or the direction indicated by arrowhead 42 in Fgi. 4A. The antennas 38 and 39 are preferably spaced less than a half wave length and angle $\alpha$ may have any value other than 90 degrees. In the system of Fig. 1, however, wherein two pairs of spaced antennas are employed, the pair making an angle less than 45 degrees with the wave path is preferably employed for sense determination.

In Figs. 3B and 4B, vectors 43 and 44 represent the phase relation between the energies absorbed by the two diagonally opposite antennas 38 and 39 of Figs. 3A and 4A. The phase of one of these energies is reversed before reaching the stator goniometer coils by reason of the transposition in the branch line associated with antenna 39, for example. This is illustrated in Fig. 3B wherein the leading vector 43, assuming direction 41, is reversed to the position of vector 45; and in Fig. 4B wherein the lagging vector 44, assuming direction 42, is reversed to the position of vector 46. Vectors 47 in these figures represent the normal output of a receiver connected to these two antennas, the delay circuit being removed from the system. When the energy from antenna 38, that is, the energy whose phase was not reversed, is delayed vector 49 is retarded to a position represented by vector 48, Fig. 3B, in the case of direction 41; and in the case of direction 42, vector 43 is retarded to a position represented by vector 49. The effect of delaying the current from antenna 38 is to increase the normal output receiver current represented by vector 47 to a value represented by vector 50 as shown in Fig. 3B when the current absorbed by antenna 39 leads that absorbed by antenna 38, that is, when the wave has a direction 41 and to decrease the receiver output to a value represented by vector 51 in Fig. 4B when the wave has a direction 42. In view of this explanation it is evident that the operator of a system such as illustrated by Fig. 1 or Fig. 2 may easily and quickly determine both the orientation or direction of the incoming wave and the directional sense, north, south, east or west of said wave.

Obviously, the current from either antenna of a pair may be reversed for the purpose of rendering said pair similar in effect to a loop, and the phase changing circuit or device may be arranged to either delay or advance the phase of the selected current and may be associated with either antenna of the pair.

Although the invention has been disclosed in connection with certain specific embodiments and apparatus, it is to be understood that it is not to be limited to such embodiments and apparatus inasmuch as different component parts may be successfully employed without exceeding the scope of the invention.

What is claimed is:

1. A method of determining the directional sense of an incoming wave which comprises obtaining two currents each representing differently phased non-directionally received components of said wave, determining their vector sum, changing in a predetermined sense the phase of only a particular one of the said two currents, and then comparing their vector sum with said first mentioned vector sum whereby the sense of change in the vector sum indicates the directional sense of said wave.

2. A method of determining the directional sense of an incoming wave which comprises separately obtaining two voltages from only two differently phased non-directionally received wave components, obtaining a third voltage representing the vector sum of said voltages, determining the intensity of the third voltage, delaying the phase of a particular one of the first-mentioned two voltages without affecting the phase of the other of said first-mentioned two voltages, and again determining the intensity of said third voltage.

3. A method of determining the directional sense of an incoming radio wave utilizing two stationary non-directional absorbing elements, means for measuring electrical energy connected thereto and a delay circuit which comprises measuring the vector sum of the two currents induced in said elements by non-directionally absorbed wave components, delaying the flow of only a particular one of the said two currents, and then comparing the vector sum of said currents with the first mentioned vector sum, whereby the sense of change in said effects indicates whether the delayed component leads or lags said other component as absorbed.

4. A method of determining the sense of a radio wave utilizing two crossed pairs of non-directional antennas, one pair of which is associated with one stator goniometer coil and another pair of which is associated with the other stator goniometer coil, a measuring device, a search coil, a translation device connected thereto, and a phase delay device, which comprises determining the path of said wave, positioning said search coil parallel to one of the stationary goniometer coils, measuring the output intensity of said translation device, inserting the phase delay circuit between said coil and a chosen one of the associated antennas and again measuring the output intensity of said translation device.

5. In a radio system for determining the direction and sense of a radio wave, four tuned non-directional vertical antennas positioned at the compass corners of a square, a receiver, an indicator connected thereto, a goniometer comprising a search coil connected to said receiver and two stator coils each of which is connected to a different pair of diagonally opposite antenna, the connection between one antenna of each pair and the associated coil being in effect reversed, and two delay circuits one of which is removably included between one antenna of each pair and the associated coil.

6. In combination, a pair of spaced receiving antennas, a load impedance, separate lines connecting said antennas to the load impedance, and a high impedance connected across one of the lines for rendering the impedance terminating the other line and comprising said first-mentioned line and said load impedance substantially constant.

7. In a radio system for determining the direction and sense of a radio wave, four tuned non-directional antennas positioned at the corners of a square, a receiver, an indicator connected thereto, a goniometer comprising a search coil connected to said receiver and two stator coils each of which is connected to a different pair of diagonally opposite antennas, the connection between one antenna of each pair and the associated coil being in effect reversed, two delay circuits one of which is removably included between one antenna of each pair and the associated coil, and a plurality of stabilizing resistances one of which is included between each antenna and the associated goniometer coil effectively in shunt to said coil.

8. An open antenna, a coil and a condenser connected in series therewith, a second coil, a transmission line having one input terminal connected through the second coil to one terminal of said condenser and its other input terminal connected to said condenser, at a given frequency the reactances of said condenser and said second coil having the same magnitude, substantially, and the reactance of said first coil being approximately equal to $$Z_c \pm \sqrt{KZ_l Z_v - \frac{Z_c^4}{Z_l^2}}$$

where $Z_c$ is the condenser reactance, $K$ is a constant, $Z_l$ the input impedance of said line, and $Z_v$ the expected antenna maximum impedance variations.

9. In combination, a pair of antennas, separate transmission lines connected thereto, a common terminating impedance connected across said lines and having a value equal to the characteristic impedance of each of said lines, and a plurality of impedances each having a large value compared to that of said terminating impedance and a different one of which is connected across each line, whereby the impedance of each line and associated antenna is effectively removed from the other branch line.

CHARLES B. AIKEN.